United States Patent Office 3,384,075
Patented May 21, 1968

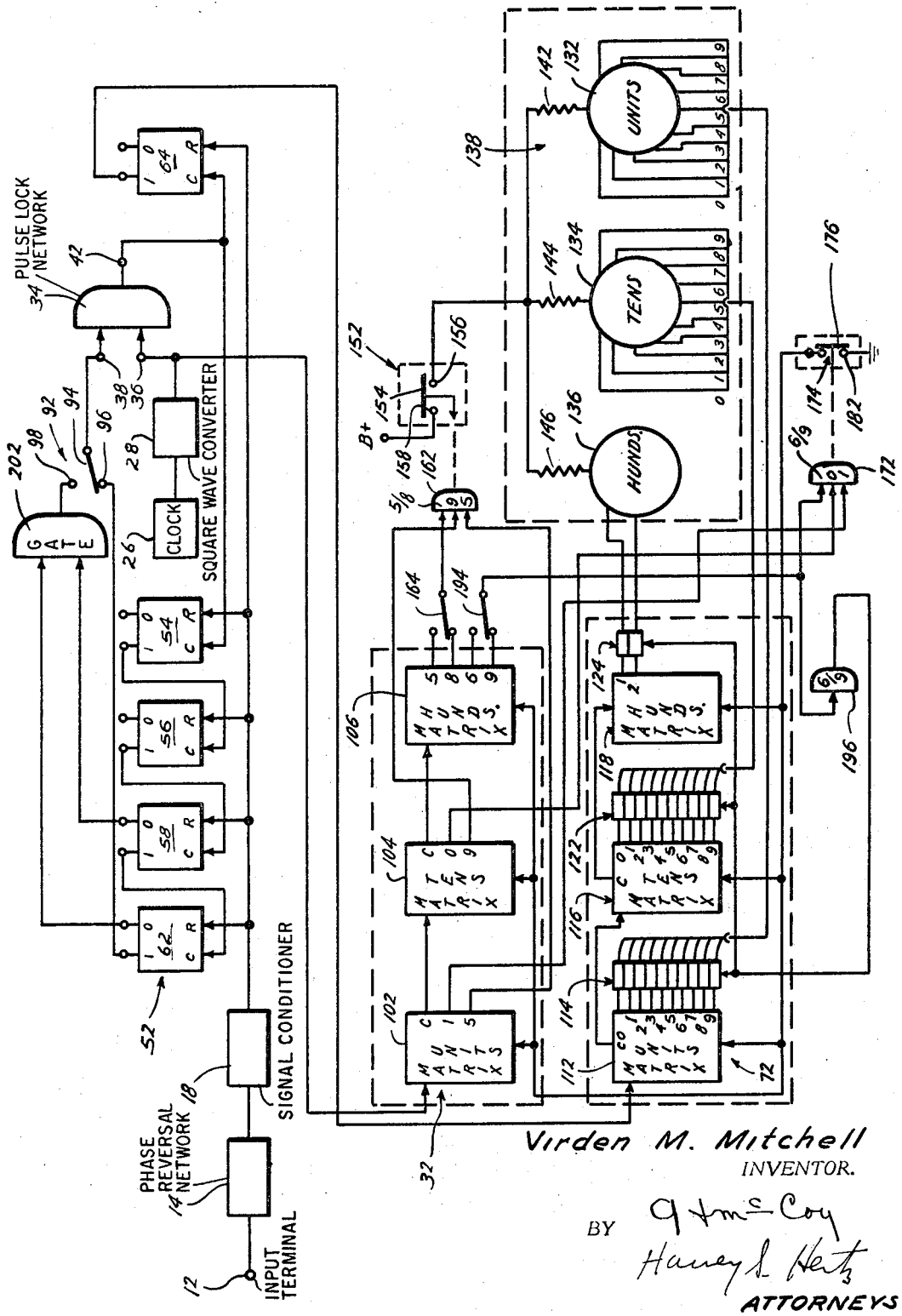

3,384,075
DIGITAL CARDIOTACHOMETER SYSTEM
Virden M. Mitchell, Satellite Beach, Fla., assignor to the United States of America as represented by the Administrator of the National Aeronautics and Space Administration
Filed Oct. 1, 1965, Ser. No. 492,344
5 Claims. (Cl. 128—2.06)

ABSTRACT OF THE DISCLOSURE

The invention comprises a system for measuring the heartbeat rate over a predetermined portion of a minute and then converting the rate to heartbeats per minute which is displayed on a readout device. A pulse representative of a heartbeat is used to reset a counting circuit. Each time the counting circuit is reset, pulses are fed to a memory network so that the display will read the heartbeat rate per minute. Thus, if the heartbeat is pressured over a fifteen second interval, four pulses will be fed to the memory for each heartbeat pulse signal, and if the heartbeat is measured over a ten second interval, six pulses will be fed to the timing circuit for each heartbeat pulse signal.

---

The invention described herein may be manufactured and used by or for the Government of the United States of America for governmental purposes without the payment of any royalties thereon or therefor.

This invention relates in general to a digital cardiotachometer system and, more particularly, to a circuit for measuring and displaying the heartbeat rate of a subject for a short period of time.

With the advent of the manned space program and the necessity of large amounts of equipment being dependent upon the physical condition of human beings, it becomes necessary to automatically present to both medical and operational personnel certain medical data needed to determine the continuance or modification of operational programs of manned spaced flight. Such data must not only be readily available without interpolation, but must be current to within seconds so that decisions dependent upon such data can be rapidly made.

Heretofore, devices which have been used to measure heartbeat rate have been difficult to analyze in relatively short periods of time. An electrocardiograph requires study of the graph itself to measure the heartbeat rate. Electrical instruments which may be read directly, such as a galvanometer, are not sensitive enough to register each pulse interval as they are sluggish, average-reading devices without the necessary fast recovery capabilities necessary to respond to fast changes in pulse separation. Further, such instruments, when read on a galvanometer where the scale is nonlinear and compressed at higher rates, are difficult to read.

In order to overcome the attendant disadvantages of prior art heartbeat rate measuring systems, the system of the present invention measures the heartbeat rate over a predetermined portion of a minute, and converts the rate to heartbeats per minute which is displayed on a readout device.

More particularly, the invention comprises an input phase reversal network into which signals representative of the heartbeat waveform of a subject whose heartbeat rate is to be measured is fed. The output of the phase reversal network is fed into a signal conditioning circuit. The output of the signal conditioner, which is a pulse representative of a heartbeat, is fed into the reset terminals of four flip-flop circuits. The four flip-flop circuits are arranged to form a standard binary counting circuit. Further, a 60-cycle source of AC voltage is fed into a square wave converter, the output of which is a square wave pulse for each cycle of input. The pulses from the square wave converter are fed into a timing circuit comprising a units counter, a tens counter, and a hundreds counter. The pulses are also fed into one of the input terminals of a pulse lock network. The output terminal of the pulse lock network is coupled into an output flip-flop circuit and also into the first flip-flop circuit of the binary counter. The output of the output flip-flop circuit is fed into a memory network having a units counter, a ten counter, and a hundreds counter, each counter also containing a memory core.

Each time a signal representative of a heartbeat is placed into the phase reversal network, an output pulse causes each flip-flop of the binary counter and the output flip-flop to reset to the zero state. The pulses from the square wave converter are fed through the pulse lock network to the binary counter and to the output flip-flop. For each two pulses from the square wave converter fed into the binary counter, one pulse is fed through the output flip-flop and is counted by the memory network. Upon counting a predetermined number of pulses from the square wave converter, the binary counter feeds a pulse into a second input terminal of the pulse lock network and no output pulses can be fed from the output flip-flop to the memory network. Upon receipt of the next pulse from the signal conditioner representative of a heartbeat, the binary counter flip-flops and the output flip-flop are all reset and once again start to count pulses from the square wave converter. At the end of a predetermined portion of a minute, the number of counts stored on the memory network are fed into a readout circuit where the heartbeat rate in beats per minute is displayed.

The advantage of this invention, both as to its construction and mode of operation, will be readily appreciated as the same become better understood by reference to the following detailed description when considered in connection with the accompanying drawing wherein:

The figure is a diagram of a preferred embodiment of the present invention.

Referring now to the drawing, there is shown in the figure the digital cardiotachometer system wherein input signals in the form of an electrocardiogram waveform from either a clinical amplifier or a ground telemetry station is fed into an input terminal 12. For each heartbeat the wave complex representative of a heartbeat waveform and commonly referred to as the QRST wave, appears in the waveform. This waveform is fed into a phase reversal network 14 which reverses the waveform should it appear inverted. The output of the phase reversal network 14 is fed into a signal conditioner 18 which filters the R wave from the input signal. The output of the signal conditioner is a pulse for each R wave pulse.

Forming a clock for the system is a transformer 26 which steps down a standard 115 volt, 60 c.p.s. AC source input so that the output of the transformer is a 5 volt, 60 c.p.s. AC signal. The 5 volt output of the transformer is fed into a square wave converter 28 which produces a square wave output pulse for each input cycle of power, that is, with 60-cycle power applied to the input of transformer 26, sixty pulses per second will be produced by the square wave converter 28. The output of the square wave converter 28 is connected to a timing circuit 32 and also to a pulse lock network 34 at one of its input terminals 36. The pulse lock network, which is an AND gate, contains a second input terminal 38 and an output terminal 42.

A binary counting circuit 52 comprises four flip-flop circuits 54, 56, 58, 62. Each of the flip-flop circuits contains a reset input terminal (R) and a complement input terminal (C) and each contains a first output terminal (0) and a second output terminal (1). Output pulses from the signal conditioner 18, each of which is representative of a heartbeat pulse applied to the input terminal 12, are coupled to the R terminal of the flip-flops 54, 56, 58, 62. Each time a pulse representative of a heartbeat is emitted by signal conditioner 18, the four flip-flops are reset to their zero output state.

The output terminal 42 of the pulse lock network 34 is connected to the C terminal of flip-flop 54 and to the complement input terminal (C) of an output flip-flop network 64. The output flip-flop network 64 contains, in addition to the input C terminal, an input reset (R) terminal and an output zero (0) terminal and an output one (1) terminal. The output 1 terminal of flip-flop 64 is connected to a memory network 72. The input R terminal of flip-flop 64 is connected to the signal conditioner 18 so that the flip-flop 64 is also reset each time an output pulse appears at the output of the signal conditioner.

The 1 terminal of flip-flops 54, 56, and 58 are connected to the C terminals of flip-flops 56, 58, and 62, respectively. The 1 terminal of flip-flop 62 is connected to the input terminal 38 of the pulse lock network 34 through a switch network 92. The switch network 92 comprises an armature 94 connected to input terminal 38 at one end and alternately positioned between terminals 96, 98, the terminal 96 being connected to the 1 terminal of flip-flop 62.

The timing circuit 32 comprises a units counter 102, the square wave converter 28 being coupled to the units counter input terminal. The output terminal of the units counter 102 is coupled to the input terminal of a tens counter 104, the output terminal of which is connected to the input terminal of a hundreds counter 106, as is conventional.

The memory network 72 comprises a units counter 112, the 1 output terminal of output flip-flop circuit 64 being coupled to the input terminal of the units counter 112. Each digit of the units counter is respectively connected to a units memory core 114. The output terminal of the units counter is connected to the input terminal of a tens counter 116, the output terminal of which is connected to the input terminal of a hundreds counter 118 as is conventional. Further, each digit of the tens counter 116 and the hundreds counter 118 is connected to a tens memory core 122 and a hundreds memory core 124, respectively.

The output of the memory cores 114, 122, and 124 are connected to a units display 132, a tens display 134, and a hundreds display 136, respectively, of a readout circuit 138. The readout circuit display each may be formed of nixie tubes as is conventional.

The readout displays 132, 134, and 136 are connected through resistors 142, 144, and 146, respectively, to a relay circuit 152. The relay circuit 152 comprises a normally open armature 154 and a pair of terminals 156, 158, the terminal 156 being connected to the junction of resistors 142, 144, and 146, and the terminal 158 being connected to a voltage source (B+).

A Forget NAND gate 162 comprises three input terminals and an output terminal, the output terminal being connected to the energizing circuit of relay 152. For illustration purposes, numerals 5 and 9 of the units counter 102 and the tens counter 104, respectively, are connected to two of the input terminals of gate 162. Connected to the third input terminal is a switch 164 which may be connected to either the numeral 5 or numeral 8 of hundreds counter 106.

A Reset NAND gate 172 comprises three input terminals and an output terminal, the output terminal being connected to the energizing circuit of a normally closed relay 174. The relay 174 comprises an armature 176 and a pair of terminals 178, 182. Terminal 178 is connected to a control terminal of each of the counters 112, 116, and 118 of memory network 72 and the counters 102, 104, and 106 of timing circuit 32. Terminal 182 is connected to ground.

For illustration purposes, the numeral 1 and the numeral 0 of the units counter 102 and the tens counter 104, respectively, are shown connected to two of the input terminals of gate 172. Connected to the third input terminal of gate 172 is a switch 194 which may be connected to either numeral 6 or numeral 9 of hundreds counter 106.

The side of the switch 194 connected to the third input terminal of gate 192 is also connected to the input terminal of a read gate 196. The output terminal of the gate 196 is connected to a control terminal of each of the memory cores 114, 122, and 124.

The system thus far described, with the switch 164 connected to the numeral 8 of hundreds counter 106, the switch 194 connected to the numeral 9 of the hundreds counter 106 and armature 94 connected to terminal 96, will produce an average heartbeat rate per minute which is displayed on the readout device 138 for an average period of 15 seconds. Should it be desired to display the heartbeat rate per minute for an average period of 10 seconds, the switch 164 and switch 194 would be connected to the numeral 5 and numeral 6 of hundreds counter 106, respectively, and armature 94 would be connected to terminal 98. Further, the 0 terminal of flip-flop 62 and the 0 terminal of flip-flop 58 are connected to the two input terminals of a gate 202, repectively, the output of which is connected to the terminal 98.

With the foregoing in mind, operation of the device is as follows:

Input signals in the form of an electrocardiogram waveform are fed into the input terminal 12. For each heartbeat input into the input terminal 12, a pulse is fed to the R terminals of flip-flops 54, 56, 58, and 62 of binary counting circuit 52 and to the R terminal of output flip-flop 64. Output pulses from the square wave converter, each of which is representative of one cycle of input from the 60-cycle source, are fed to the timing circuit 32. Simultaneously, the pulses from the output of the square wave converter are coupled to the input terminal 36 of the pulse lock network 34. The output of the pulse lock network is coupled from the terminal 42 to the C terminal of flip-flop 64. Output pulses from the 1 terminal of flip-flop 64 are coupled to the memory network 72. Thus, for every two pulses produced by the square wave converter, which is allowed to pass through the pulse lock network 34 to the output flip-flop 64, one pulse will be fed to the memory network 72.

Pulses from the output terminal 42 of the pulse lock network 34 are also fed to the C terminal of flip-flop 54. Upon receipt of the eighth pulse to the binary counter 52 at the C terminal of flip-flop 54, the 1 terminal of flip-flop 62 will be energized causing an output signal to be coupled to the input terminal 38 of the pulse lock network. With signals present at both terminals 36 and 38 of the pulse lock network 34 (the pulse lock network 34 being an AND gate), pulses from the square wave converter 28 can no longer pass through the pulse lock network. Upon receipt of a pulse from the signal conditioner 18, which resets the flip-flops of the binary counters 52 and the output flip-flop 64, pulses can once again pass through the pulse lock network. Thus, as can readily be seen, for each heartbeat pulse from the signal conditioner 18, only four pulses are fed through the flip-flop 64 to the memory network 72. For the number of pulses representative of the heartbeat rate during a 15-second period, four times as many pulses are fed to the memory network 72. Thus the memory network during a 15-second period counts the average number of pulses during a minute.

At the count of 895 (15 seconds minus 5 pulses) at the timing circuit 32, forget NAND gate 162 causes the relay 152 to be momentarily de-energized, disconnecting the source of positive voltage (B+) from the readout circuit 138 and erasing the last reading on the readout circuit. At the count of 900 (15 seconds), a read pulse is fed through the gate 196 which is sent to the memory circuits 114, 122, and 124. The memory circuits feed a signal representative of the digit present therein at that instant to the readout circuit 138 where it is displayed. At the 901 count (15 seconds plus 1 pulse), the reset NAND gate 172 causes the relay 174 to be momentarily de-energized connecting terminal 178 to ground and causing the units, tens, and hundreds counters of the timing circuit 32 and the memory network 72 to be reset and the cycle is repeated.

As can be readily seen, the binary counting circuit 52 counts up to eight for each heartbeat pulse fed into the circuit and the output flip-flop 64 feeds four pulses to the memory network 72 so that the heartbeat rate in beats per minute may be read over a 15-second period.

As an alternative embodiment of the present invention, with the armature 94 connected to terminal 98 and switches 164 and 194 connected to the numeral 5 and numeral 6, respectively, of hundreds counter 106, the binary counting circuit 52 counts up to 12 whereupon the pulse lock network 34 no longer allows pulse from converter 28 to pass to flip-flop 64. Flip-flop 64 feeds six pulses to the memory network 72, producing six counts for each heartbeat input. Thus, the heatbeat rate measured over a ten-second interval would be representative of the heartbeat rate per minute. It should be understood, of course, that other time periods could be utilized, the 10-second and 15-second time period being merely illustrative of an example of the invention.

It should be further understood that the foregoing disclosure relates only to preferred embodiments of the invention, and that it is intended to cover all changes and modifications of the examples of the invention herein chosen for the purpose of the disclosure which do not constitute departures from the spirit and scope of the invention.

What is claimed and desired to be secured by Letters Patent is:

1. A digital cardiometer system for measuring a heartbeat rate for a first period of time and producing an output representative of the rate for a second period of time comprising:
    (A) a source of clock pulses;
    (B) a source of electrical pulses, each pulse being representative of a heartbeat;
    (C) a binary counting circuit comprising a plurality of flip-flop circuits, one of said flip-flop circuits being designated an input flip-flop circuit, each flip-flop circuit having first and second input terminals and first and second output terminals;
    (D) an AND gate having a first input terminal and a second input terminal and an output terminal, means for electrically connecting said source of clock pulses to said AND gate first input terminal; means coupling one of said flip-flop output terminals of said binary counting circuit to said AND gate second input terminal; and means connecting said AND gate output terminal to the second input terminal of the input flip-flop of said binary counting circuit;
    (E) an output flip-flop circuit having a first and second input terminals and a first and second output terminals; means connecting said AND gate output terminal to said second input terminal of said output flip-flop circuit;
    (F) means connecting said source of heartbeat pulses to the first input terminal of each of said binary counting circuit flip-flops and the first input terminal of said output flip-flop;
    (G) a timing circuit having an input terminal, means electrically connecting said source of clock pulses to the input terminal of said timing circuit;
    (H) a memory network having an input terminal, means connecting the second output terminal of said output flip-flop to the input of said memory network; and
    (I) a readout circuit for displaying the heartbeat rate for said second period of time, each time said timing circuit reaches a count equal to said first period of time; and means coupling the output of said memory network to said readout circuit;
    whereby said output flip-flop circuit produces a plurality of output pulses at its second output terminal for each heartbeat pulse, said plurality of output pulses being equal to the ratio of said second period of time divided by said first period of time and equal to twice the count representative at the output terminal of said flip-flop connected to said AND gate second input terminal.

2. A digital cardiometer system in accordance with claim 1 wherein said first period of time is equal to 15 seconds and said second period of time is equal to one minute.

3. A digital cardiometer system in accordance with claim 1 wherein said first period of time is equal to 10 seconds and said second period of time is equal to one minute.

4. A pulse-rate system for measuring the rate of electrical input pulses for a first period of time and producing an output representative of the rate for a second period of time comprising:
    a source of clock pulses;
    a source of input electrical pulses, each of said input electrical pulses being representative of a heart beat;
    a binary counting circuit comprising a plurality of flip-flops, each flip-flop circuit having a first and second input terminals and a first and second output terminals;
    a gating circuit having first and second input terminals and an output terminal, means connecting said source of clock pulses to said gating circuit first input terminal and means coupling an output terminal of one of said flip-flops of said binary counting circuit to said gating circuit second input terminal and means connecting said gating circuit output terminal to the second input terminal of a flip-flop of said binary counting circuit;
    an output flip-flop circuit having first and second input terminals and a first and second output terminals, means connecting said gating circuit output terminal to said second input terminal of said output flip-flop circuit, said output flip-flop circuit producing a plurality of pulses at its second output terminal for each input electrical pulse to said system, said plurality of output pulses being equal to said second period of time divided by said first period of time;
    means connecting said source of input electrical pulses to the first input terminal of each of said binary counting circuit flip-flops and the first input terminal of said output flip-flop;
    a timing circuit having an input terminal and means connecting said source of clock pulses to the input terminal of said timing circuit;
    a memory network having an input terminal and output terminal, and means connecting the second output terminal of said output flip-flop to the input of said memory network; and a readout circuit for displaying the electrical input pulse rate for said second period of time, and means coupling the output of said memory network to said readout circuit.

5. A pulse rate system in accordance with claim 4 wherein the output terminal of said binary counting circuit coupled to said gating circuit input terminal is the terminal representative of a count equal to twice the number of said plurality of pulses produced by said output flip-flop at the second output terminal.

References Cited

UNITED STATES PATENTS

| | | |
|---|---|---|
| 2,760,186 | 8/1956 | Hall. |
| 3,123,768 | 3/1964 | Burch. |
| 3,126,886 | 3/1964 | Karsh. |
| 3,144,019 | 8/1964 | Haber. |
| 3,267,934 | 8/1966 | Thornton _____ 128—2.06 |

RICHARD A. GAUDET, *Primary Examiner.*

S. BRODER, *Examiner.*